(12) United States Patent
Lee

(10) Patent No.: US 7,848,516 B2
(45) Date of Patent: Dec. 7, 2010

(54) DIFFUSED SYMMETRIC ENCRYPTION/DECRYPTION METHOD WITH ASYMMETRIC KEYS

(76) Inventor: Chiou-Haun Lee, P.O. Box 36-80, Taichung City (TW)

( * ) Notice: Subject to any disclaimer, the term of this patent is extended or adjusted under 35 U.S.C. 154(b) by 1358 days.

(21) Appl. No.: 11/336,746

(22) Filed: Jan. 20, 2006

(65) Prior Publication Data

US 2007/0189516 A1 Aug. 16, 2007

(51) Int. Cl.
*H04L 9/00* (2006.01)
(52) U.S. Cl. .......................... 380/30; 713/189
(58) Field of Classification Search .................. 380/30; 713/189
See application file for complete search history.

(56) References Cited

U.S. PATENT DOCUMENTS

| | | | | |
|---|---|---|---|---|
| 4,405,829 A * | 9/1983 | Rivest et al. | ................... | 380/30 |
| 4,633,036 A * | 12/1986 | Hellman et al. | ................ | 380/30 |
| 5,142,579 A * | 8/1992 | Anderson | .................... | 380/30 |
| 5,799,088 A * | 8/1998 | Raike | ........................... | 380/30 |
| 6,259,790 B1 * | 7/2001 | Takagi et al. | .................. | 380/30 |
| 6,307,936 B1 * | 10/2001 | Ober et al. | ..................... | 380/30 |
| 6,396,926 B1 * | 5/2002 | Takagi et al. | .................. | 380/28 |
| 2002/0016773 A1 * | 2/2002 | Ohkuma et al. | .............. | 705/50 |
| 2002/0039420 A1 * | 4/2002 | Shacham et al. | ............ | 380/277 |
| 2002/0186837 A1 * | 12/2002 | Hopkins et al. | ............... | 380/28 |
| 2004/0062390 A1 * | 4/2004 | Slavin | ......................... | 380/30 |
| 2004/0208317 A1 * | 10/2004 | Imai et al. | ..................... | 380/44 |
| 2005/0220299 A1 * | 10/2005 | Lipson | ......................... | 380/30 |
| 2007/0058806 A1 * | 3/2007 | Ferguson | ..................... | 380/42 |

OTHER PUBLICATIONS

Fast encryption for multimedia Xun Yi; Chik How Tan; Chee Kheong Slew; Rahman Syed, M.; Consumer Electronics, IEEE Transactions on vol. 47, Issue 1, Feb. 2001 pp. 101-107 Digital Object Identifier 10.1109/30.920426.*

* cited by examiner

*Primary Examiner*—Thanhnga B Truong

(57) ABSTRACT

This invention discloses a symmetric encryption/decryption method with asymmetric keys processed by diffusion algebra, and more particularly to a multiplication method using one-dimensional matrix displacement and addition to generate a ciphertext by multiplying a public (or private) key with a plaintext or obtain the plaintext by multiplying the private (or public) key with the ciphertext.

13 Claims, 1 Drawing Sheet

DIFFUSED SYMMETRIC ENCRYPTION/DECRYPTION METHOD WITH ASYMMETRIC KEYS

BACKGROUND OF THE INVENTION

1. Field of the Invention

The present invention relates to a symmetric encryption/decryption method with asymmetric keys processed by diffusion algebra, and more particularly to a multiplication method using one-dimensional matrix displacement and addition to generate a ciphertext by multiplying a public (or private) key with a plaintext or obtain the plaintext by multiplying the private (or public) key with the ciphertext.

2. Description of the Related Art

A prior art asymmetric encryption/decryption method generates a public key and a private key by two large prime numbers, so as to generate a ciphertext by taking the power of a public (or private) key and obtain the plaintext from the power of the ciphertext. The key safety point of the prior art emphasizes on the product of two large prime numbers, because such value cannot be decoded or restored to prime numbers within a short time, so as to enhance the safety for matching the public and private keys.

SUMMARY OF THE INVENTION

The prior art adopts a power operation, and an increase of the power value of the plaintext varies exponentially with the processing time. Therefore, it is necessary to increase the power value in order to improve the safety, and the length of the plaintext cannot be too long, and it takes even longer time to complete processing the plaintext with an increase of length.

The technical measures taken by the present invention for solving the issues are described as follows:

The operations of diffusion algebra are used to select a matched pair of public key and private key, and the public (or private) key is multiplied with a plaintext to generate a ciphertext, and the private (or public) key is multiplied with the ciphertext to obtain the plaintext.

Compared with the prior art, the differences of the present invention from the prior art reside on that:

1. Prime Number: The prime number used in the prior art is defined as an integer indivisible by any other integer smaller than that integer and requires some time to obtain the value, and the prime number used in the present invention is easily to obtain. For example, if the length of the prime number is equal to 2 to the power of at least one, the prime number will have an odd number of 1s.

2. Modulus: The prior art includes the operation of a modulus to restrict the content of the plaintext not greater than the modulus, and the present invention does not use the operation of modulus, and thus has no such limitation.

3. Operation: The prior art adopts a power operation or a multi-multiplication, and the present invention directly adopts the multiplication operation, which takes only one multiplication to provide a quick processing.

DETAILED DESCRIPTION OF THE PREFERRED EMBODIMENTS

The asymmetric encryption/decryption method of the present invention directly uses the multiplication of diffusion algebra comprising:

Symbols and Definition of Diffusion Algebra:

S indicates a one-dimensional binary matrix having n positions, where n>0. The position label is shown below:

| n − 1 | n − 2 | n − 3 | ... | 1 | 0 |
|---|---|---|---|---|---|

$e_i$ indicates an element, and the value at the i-th position label of S is 1, and the rest are 0.

For example, (a) $e_0$: [0 0 0 ... 0 1] (b) $e_{n-1}$: [1 0 0 ... 0 0]

● indicates a null element, and the values of S are all 1 or all 0.

For example, (a) ●: [0 0 0 ... 0 0] (b) ●: [1 1 1 ... 1 1]

⊕ indicates an addition: Two matrixes are added by diffusion.

For example, (a) $e_i \oplus e_i = *$ (b) $S \oplus ● = S$

ⓧ indicates a multiplication: Two matrixes are multiplied by diffusion.

For example, (a) $e_i ⓧ e_j = e_{i+j}$ (b) $S ⓧ ● = ●$ (c) $(e_i \oplus e_j) ⓧ e_k = e_{i+k} \oplus e_{j+k}$ (d) $e_i = e_{i \bmod n}, i \geq n$ $S^i$ indicates S to the power of i.

Figure 1:
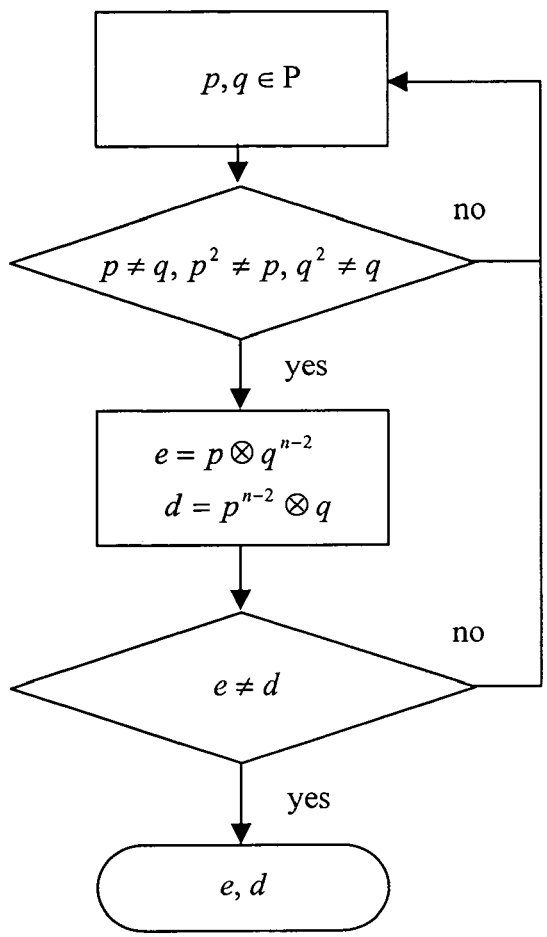
FIG. 1 is a flow chart of a public key and a private key according to the present invention.

For example, (a) $S^0 = S$ (b) $S^1 = S ⓧ S$ (c) $S^i ⓧ S^j = S^{i+j+1}$ (d) $(S^i)^j = S^{(i+1)\times(j+1)-1}$ T indicates a recurring period, $S^T = S$ For example, (a) $e_0^{\,1} = e_0$, (b) $e_{n-1}^{\,n} = e_{n-1}$ indicates a prime number, $S^{T-1} = e_0$ For example, (a) $e_i \in P$ (b) $e_i ⓧ e_j \in P$ (c) $e_i \oplus e_j \notin P$ Public Key and Private Key:

The length of a matched pair of public key (e) and private key (d) is n, and assumed T=n, its generation comprises the following steps as shown in FIG. 1.

$$p, q \in P, \text{ and } p \neq q, \text{ and } p^2 \neq p, q^2 \neq q; \quad (1)$$

$$e ⓧ d = (p ⓧ q)^{n-1}; \quad (2)$$

$$e = p ⓧ q^{n-2}, d = p^{n-2} ⓧ q; \quad (3)$$

Figure 2:
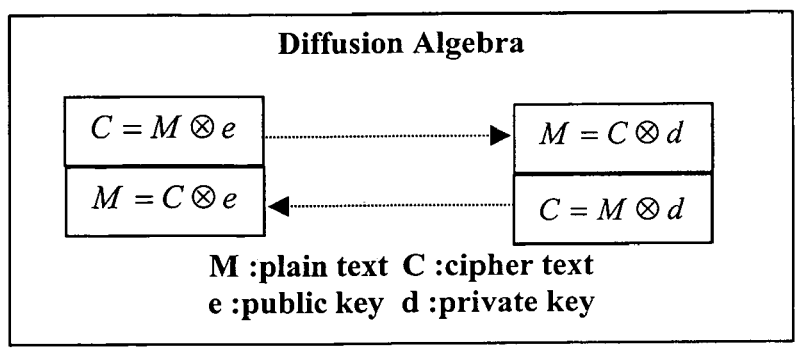
FIG. 2 is a flow chart of an encryption and a decryption according to the present invention.

Encryption and Decryption:

In the structure of diffusion algebra, the product of two numbers cannot be divided by one of the two numbers and must be factorized by multiplying a corresponding third number, which corresponds to the matched pair of public and private keys as shown in FIG. 2:

$$C = M ⓧ e; \text{ (Plaintext Encryption)} \quad 1$$

$$M = C ⓧ d; \text{ (Ciphertext Decryption)} \quad 2.$$

Examples of Encryption and Decryption:

To make it easier for our examiner to understand the content of the present invention, the following diffusion multiplication, public key and private key, encryption and decryption, 128-bits and 240-bit embodiments are described in details.

Let a one-dimensional 8-bit matrix be p=[10011101], q=[11011010]:

By Diffusion Multiplication:

$p ⓧ q = p ⓧ (e_7 \oplus e_6 \oplus e_4 \oplus e_3 \oplus e_1) = p ⓧ e_7 \oplus p ⓧ e_6 \oplus p ⓧ e_4 \oplus p ⓧ e_3 \oplus p ⓧ e_1 = [11001110] \oplus [1100111] \oplus [11011001] \oplus [11101100] \oplus [00111011] = [10100111]$ Public Key and Private Key:

$e = p(x) q^{n-2} = p(x) q^6 = [10011101](x) [11000001] = [00110100]$ $d = p^{n-2}(x) q = p^6(x) q = [11011001](x) [11011010] = [01111010]$

Encryption and Decryption:

$M = [00110111]$ $C = M(x) e = [00110111](x) [00110100] = [01001001]$ $M = C(x) d = [01001001](x) [01111010] = [00110111]$

In the 128-bit Embodiment, Public Key and Private Key:

The length of 128 bits is equal to 2 to the power 8, and the prime number (P) is selected to have an odd number of is to comply with the conditions, and it is easy to obtain. The recurring period (T) is set directly to the length of 128 bits.

p: Prime Number
11100000111101000011011100101010100111
0001111001110000001010101011100000011100
1110110110010000011001111111011101011010
00110110 q: Prime Number
0111000110100001011011000011110000000100
1111111010110111101111000010011010101011
10001001110110111001111100011000111110111
00100001 e: Public Key $p(x) q^{128-2}$
10001000001001010011100010111111100101100
1001001010000001011001010001000101101010
110110010011000100110010011001100000001
11111100 d: Private Key $p^{128-2}(x) q$
01100001010111100011001011100110000100000
00001100001000000011001001101011010000010
11111101011001101110011100000011000000011
10101111

Encryption and Decryption:

M: Plaintext
00111101100101101010101011100010010010
1000001100001101001111000010101000010101
10100011010010010100001011110010111100101
11001100

C: Encrypt $C = M(x) e$
11100110110001010001010111001101100101011
1101100111010111110101010111010001010000
1100001111101010101010011101011011111001
01000011

M: Decrypt $M = C(x) d$ to obtain the plaintext.

For 240-bit embodiment, Public Key and Private Key:

The length of 240 bits is not in the form of a power of 2, and the prime number(P) is selected to have an odd number of 1s and $S^{T-1} = e_0$ and the prime number is searched. The recurring period (T) is set directly to the length of 240 bits.

p: Prime Number
0010101010000010101100101001000011101
1010011000001011011011000111000011111111
1000010111110011001000001010110111110110
010100111001000111011011000110011110110
01111001001111101011100111001000000100
10110001110101011111111010010111011011010 q: Prime Number
0110110111110100101101100010100101010111
0000100001111111100110110011001111100011
110101010011110011000101000001101010100
111100101110101000110010010010010001011
00111011000011100111000110100100000101110
10100111111110100111010111100001011011101 e: Public Key $p(x) q^{240-2}$
10111100110110111111110110000011110111010
0000111110000100110110010011011010111000
01010001001100000010001001001111000000001
01100001001001010111001010010100001110
110101110110110000111000111001111111001
0101101101000001000111010110000011010110 d: Private Key $P^{240-2}(x) q$
10110010000111110010010110110101010101110
101100001011100101011111111110101011011
11000100000001011111110011101011111010001
001100101011101010100000101100000011001
01101001011100111011100010111010100100101
11100101111111011011010100011011010011111

Encryption and Decryption:

M: Plaintext
101010000010100110110110110100000100101
1000000111111011101001001101010010010000
110100100011010110000011111010111110011
0101011000101000000011111111101101010111
000110111011000011101010001010011101111
110011001100000010011110110010001111100000

C: Encrypt $C = M(x) e$
1011000011010010101100001010100110000011
000110001101110111110001101011100100001
0100101010110100110011000111001110100101
011111110010010011100111011000111001110001
0010011001000111001010010010101001000011
00010011100011111010000110011111000110110

M: Decrypt $M = C(x) d$ to obtain the plaintext.

In this preferred embodiment, the applied multiplication of diffusion algebra is not reversible, and division does not exist in diffusion algebra. Once if a plaintext is multiplied by a key, then the plaintext cannot be restored. Further, a new prime number generated by taking the power of a prime number cannot be restored to the original prime number. In other words, a matched pair of keys, a key cannot be used to compute another key. Finally, two numbers are multiplied by displacement and addition to expedite the processing. With the risk of safety taken into consideration, we can easily increase the bit length of the keys.

While the invention has been described by means of specific embodiments, numerous modifications and variations could be made thereto by those skilled in the art without departing from the scope and spirit of the invention set forth in the claims.

What is claimed is:

1. A diffused symmetric encryption/decryption method using a first computer and a second computer with asymmetric keys, wherein said method operates pursuant to the mathematical architecture of diffusion algebra, comprising steps of:

i. selecting a matched pair of a public key and a private key, wherein said matched public key and private key are a numeric value S, wherein S indicates a one-dimensional binary matrix having n>0 positions, and position labels are from 0 to n−1; in addition, S comprises at least one various element $e_k$, wherein $e_k$ indicates that the value at the position label k of S is 1, and the rests are 0;

ii. if the multiplication of said matched public key and private key is equal to $e_0$, go to the next step, otherwise go back to Step i, wherein the multiplication contains at least one addition of all elements of one S multiplying by every element of the other S, wherein two elements on detail, $e_i$ multiplying by $e_j$ is equal to $e_k$ (under linear algebra, k=i+j, if (i+j)≧n, then (i+j)mod n); further, the addition at every time, wherein all elements are included, except for elements at the same position label;

iii. using the first computer to multiply said public or said private key with a plaintext to generate a ciphertext, wherein the plaintext is a numeric value S; and iv. using the second computer to obtain said plaintext by multiplying said private key or said public key with said ciphertext.

2. The method of claim 1, wherein said public key is not equal to said private key.

3. The method of claim 1, wherein said plaintext has a plurality of 1s.

4. The method of claim 1, wherein the multiplication of said matched public key and private key is equal to a prime number to the power of (T−1), wherein T is a recurring period, implying $S^T = S$.

5. The method of claim 4, wherein T is the length of said matched pair of public key and private key.

6. The method of claim 4, wherein T is greater than 2.

7. The method of claim 4, wherein said public key is equal to said prime number, and said private key is equal to said prime number to the power of (T−2).

8. The method of claim 4, wherein said public key is equal to said prime number to the power of (T−2), and said private key is equal to said prime number.

9. The method of claim 4, wherein said prime number has an odd number of 1s.

10. The method of claim 4, wherein said prime number is equal to another prime number to the power of at least one.

11. The method of claim 4, wherein said prime number is equal to the multiplication of at least one prime number.

12. The method of claim 4, wherein said prime number is an addition of odd numbers of prime numbers.

13. The method of claim 9, wherein at least one of said odd number of is in odd position label.

* * * * *